UNITED STATES PATENT OFFICE 2,672,467

PROCESS FOR THE PREPARATION OF 6-HYDROXY-11-KETO-PROGESTERONE

Arthur R. Hanze and Robert Bruce Ogilvie, Kalamazoo, Mich., assignors to The Upjohn Company, Kalamazoo, Mich., a corporation of Michigan No Drawing. Application March 25, 1952, Serial No. 278,486

3 Claims. (Cl. 260—397.45)

This invention relates to a new compound, 6-hydroxy-11-keto-progesterone. An object of invention is to obtain a compound having pharmacological activity. Another object is to obtain a compound having utility in the synthesis of cortisone and other 11-oxygenated steroids.

The 6-hydroxy-11-keto-progesterone of this invention is made by controlled oxidation of 6,11α-dihydroxyprogesterone with about two equivalents or up to about two equivalents of an oxidizing agent per mol of 6,11-dihydroxyprogesterone. Suitably, potassium permanganate, N-bromoacetamide in tertiary butanol, or chromic acid may be used. Lower equivalent proportions of oxidizing agent are also productive of the desired product. The reaction may be represented as follows:

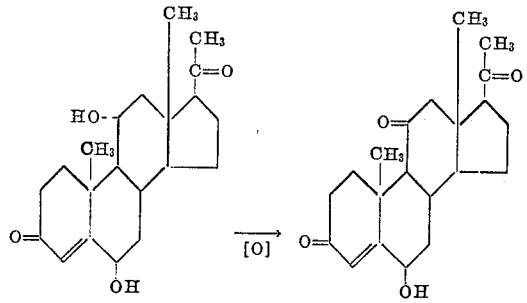

The following preparation and examples are illustrative of the processes and product of the present invention and are not to be construed as limiting.

PREPARATION.—6,11α-DIHYDROXYPROGESTERONE

A medium was prepared from five milliliters of corn steep liquor, twenty grams of Edamine commercial lactalbumin digest and fifty milligrams of Cerelose commercial dextrose per liter of tap water and adjusted to a pH of between about 5.5 and 5.9. To four liters of this medium containing a 32 to 48 hour growth of *Rhizopus arrhizus*, ATCC 11145, at room temperature with aeration was added one gram of progesterone in fifty milliliters of acetone. The culture was then incubated at room temperature for 48 hours. At the end of this time, the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of a two percent aqueous sodium bicarbonate solution and three 500-milliliter portions of distilled water. The methylene chloride extract was evaporated to dryness in vacuum and the solid residue taken up in fifty milliliters of methylene chloride. The solution was transferred to a 100-milliliter beaker and evaporated by a stream of air. The solids, weighing 1.535 grams, were dissolved in five milliliters of hot methanol and allowed to cool slowly to room temperature. Seventy-five milligrams of crystals, melting at 246 to 249 degrees centigrade, separated from the mother liquor.

*Example 1.—6-hydroxy-11-keto-progesterone*

To 100 milliliters of glacial acetic acid containing one gram of the above produced 6,11α-dihydroxyprogesterone was added 211 milligrams of chromium trioxide ($CrO_3$) in fifty milliliters of glacial acetic acid, to give a ratio of 2.18 equivalents of chromic acid per mol of steroid. After one and one-half hours at room temperature, extracting with methylene chloride, washing the extract with aqueous sodium bicarbonate and evaporating the solvent, produced crystalline 6-hydroxy-11-keto-progesterone, melting point 202 to 208 degrees centigrade.

*Example 2.—6-hydroxy-11-keto-progesterone*

To 500 milligrams (1.44 millimoles) of 6,11α-dihydroxy-progesterone was added 22 milliliters (1.03 millimoles) of chromic acid-acetic acid solution containing 0.0467 millimoles of $CrO_3$ per milliliter, to give a ratio of 2.15 equivalents of chromic acid per mol of steroid. The solution was diluted to 100 milliliters with acetic acid. After remaining at room temperature for about one hour, the reaction mixture was diluted with a few milliliters of methanol and 100 milliliters of water and extracted with methylene chloride. The extract was washed with sodium bicarbonate solution followed by a water wash. The water washed extract was dried over anhydrous sodium sulfate, filtered, and evaporated in vacuum to dryness. The residue was recrystallized from benzene. The crude crystals weighed 240 milligrams, melting point 190 to 196 degrees centigrade. The mother liquor gave thirty milligrams of material melting at 184 to 193 degrees centigrade. Recrystallization of the first crop of crystals gave pure 6-hydroxy-11-keto-progesterone, melting point 204 to 208 degrees centigrade. Infrared spectroscopy confirmed this structure.

*Analysis.*—Calculated for $C_{21}H_{28}O_4$: C, 73.0; H, 7.9. Found: C, 73.01; H, 8.12.

The 6-hydroxy-11-keto-progesterone of this invention demonstrates inhibitory properties in estrogenic, glucocorticoid, folliculoid, luteoid, testoid, hypertensive, salt retention as exhibited by desoxycorticosterone, spermatogenic and progesterone activitives. It may be dehydrated and reduced to pregnane-3,11,20-trione.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A process for the preparation of 6-hydroxy-11-keto-progesterone comprising reacting 6,11-dihydroxyprogesterone with about two equivalents of oxidizing agent per mol of 6,11-dihydroxyprogesterone.

2. A process for the preparation of 6-hydroxy-11-keto-progesterone comprising reacting 6,11-dihydroxyprogesterone with up to about two equivalents of oxidizing agent per mol of 6,11-dihydroxyprogesterone.

3. A process for the preparation of 6-hydroxy-11-keto-progesterone comprising reacting 6,11-dihydroxyprogesterone with about two equivalents of chromic acid per mol of 6,11-dihydroxyprogesterone.

ARTHUR R. HANZE.
ROBERT BRUCE OGILVIE.

References Cited in the file of this patent

UNITED STATES PATENTS

| Number | Name | Date |
|---|---|---|
| 2,403,683 | Reichstein | July 9, 1946 |